United States Patent [19]
Dodd

[11] Patent Number: 5,139,005
[45] Date of Patent: Aug. 18, 1992

[54] UNIVERSAL DRESSING ROLLER AND METHOD AND APPARATUS FOR DRESSING CUP-SHAPED GRINDING WHEELS

[75] Inventor: Harry D. Dodd, Rochester, N.Y.
[73] Assignee: The Gleason Works, Rochester, N.Y.
[21] Appl. No.: 567,464
[22] Filed: Aug. 14, 1990
[51] Int. Cl.$^5$ .............................................. B24B 53/00
[52] U.S. Cl. ............................. 125/11.01; 125/11.03; 125/11.11; 51/5 D; 51/204; 51/206 R
[58] Field of Search .................... 51/5 D, 204, 206 R, 51/209 R; 125/11.01, 11.03, 11.11, 11.13, 11.14, 38, 39

[56] References Cited

U.S. PATENT DOCUMENTS 3,418,675  12/1968  Meguiar et al. .................. 51/209 R
4,862,868  9/1989  Dodd et al.

*Primary Examiner*—M. Rachuba
*Attorney, Agent, or Firm*—Ralph E. Harper; Robert L. McDowell

[57] ABSTRACT

A tool, for dressing both the inside and outside working surfaces of cup-shaped abrasive wheels used for grinding gears, is disclosed along with methods and apparatus for using the tool. The working portion of the dressing tool has a cylindrical shape with an outside surface parallel to its axis of rotation and a top surface extending radially, to the axis of rotation. The apparatus orients the tool relative to the grinding wheel so that only the outer cylindrical surface of the tool is used to dress the inside working surface of the grinding wheel, while only the top surface of the tool is used to dress the outside working surface of the wheel. Formulas are provided for calculating the optimum radius of the cylindrical surface of the tool for providing substantially equal effective relative curvatures between the tool and each of the respective sides of the grinding wheel, thereby resulting in similar grinding characteristics being dressed into both the inside and outside working surfaces of the grinding wheel.

16 Claims, 10 Drawing Sheets

5,139,005

UNIVERSAL DRESSING ROLLER AND METHOD AND APPARATUS FOR DRESSING CUP-SHAPED GRINDING WHEELS

TECHNICAL FIELD

This invention is directed to a roller, method, and apparatus for dressing cup-shaped wheels used for grinding the teeth of gear-shaped workpieces.

BACKGROUND OF THE INVENTION

Cup-shaped grinding wheels are well known in the manufacture of precision gearing. When such grinding tools become worn, their surfaces are dressed (renewed) to their original cutting condition by using dressers, generally diamond dressers.

Such dressers are of either the "form" or "generating" type. In form-type dressing, the outer configuration of the dressing roller is shaped exactly to conform to a working surface of the grinding wheel being dressed so that, during the dressing process, the dressing tool contacts the grinding wheel along a line of contact across the entire working profile of the surface being dressed. Such form-type dressers are quite expensive and, by necessity, must be specially made to conform to a single given wheel profile.

In contrast, dressers of the generating-type effectively contact the grinding wheel at a single "point" which, by controlling the motion of the dressing tool relative to the grinding wheel, can be moved to "generate" any desired configuration for the working surface of the wheel. Such known generating-type dressing tools are often rollers formed in the shape of small dishes or thin disks with diamond grit embedded along narrow circumferential edges. Such tools are mounted in apparatus for producing the desired relative generating motions. Generally, known generating-type dressing systems initially orient the roller with its axis aligned with the working surface on one side (e.g., inside) of the cup-shaped grinding wheel, moving the roller in a direction parallel to the working surface for generating the required profile. Then, for dressing the working surface on the other side (e.g., outside) of the cup-shaped grinding wheel, the dressing roller is pivoted to a new orientation with its axis aligned with the other working surface and is rotated in the opposite direction relative to the direction of rotation of the grinding wheel.

It is generally understood in the art that, in order to dress both the inside and outside working surfaces of the wheel with substantially similar grinding characteristics (e.g., sharpness), it is necessary to provide substantially the same relative motion between the cutting surface of the dressing roller and each of the respective working surfaces of the grinding wheel. For most known systems, this requires that the rotation of the roller be reversed for dressing the respective inside and outside working surfaces of the grinding wheel. However, when a dressing roller is rotated in a first direction during the dressing operation, its dressing surface (usually diamond grit) forms a distinctive wear pattern so that, when the roller is thereafter rotated in the opposite direction to dress the other side of the grinding wheel, the initial wear pattern tends to cause the abrasive grit to break free from the roller, thereby reducing the useful life of the roller and the overall quality of the dressing operation. Also, known generating-type dressing rollers tend to wear rapidly because the zone of contact between the dressing roller and grinding wheel is necessarily limited to the narrow circumferential cutting surfaces of the dish-shaped or disk-shaped dressing rollers.

Recently, such prior art generating-type dressing systems have been improved by advances disclosed in U.S. Pat. No. 4,862,868. Namely, a dish-shaped dressing roller is provided with a radiused circumferential outer surface, and during dressing operations only a first portion of its dressing surface is used when contacting the inner surface of the grinding wheel, while a second and different portion of the dressing surface is used to contact the outer surface of the grinding wheel. Further, this dish-shaped dressing tool is oriented so that its direction of rotation remains the same when dressing both the inner and the outer surfaces of the grinding wheel.

However, this recent improvement in the dressing of cup-shaped grinding wheels, as disclosed in U.S. Pat. No. 4,862,868, still has important problems. First, the dish-shaped roller design limits the width of the working surface which can be dressed on the inside of a cup-shaped wheel. This limitation results from interference between the outer edge of the grinding wheel and the base of the dish-shaped roller. Secondly, the dish-shaped roller is expensive and difficult to manufacture due to its relatively complex shape and the thinness of its outer circumferential dressing surface. The thinness of this dressing surface, which must be plated in a very narrow mold, makes it quite difficult to obtain an even distribution of diamonds on the roller's working surfaces. Finally, this recent prior art improvement still does not overcome a major problem which affects all prior art dressing systems and which limits the ability to achieve similar cutting characteristics on the inner and outer surfaces of the wheel. Namely, this major problem arises from the fact that, when the same dressing roller is used to dress both the inside and outside surfaces of the grinding wheel, the roller has significantly different "effective" radii of curvature relative to each of the respective sides of the wheel.

If a dressing roller has a relatively small effective radius of curvature relative to the surface of the grinding wheel, the dressing operation produces a relatively sharp grain structure on the wheel. On the other hand, a relatively large effective radius of curvature results in more polished and duller cutting grains on the surface of the grinding wheel. With prior art dressing systems, there is a significant disparity in the effective radii of the dressing roller relative to the inner and outer surfaces of the cup-shaped wheel being dressed, and this results in significant differences in the grinding characteristics of these inside and outside working surfaces.

SUMMARY OF THE INVENTION

The present invention solves these problems by utilizing a cylindrical-shaped roller for contour grinding. The cylindrical shape of the dressing roller is much simpler to manufacture than the dish- or disk-shaped dressing tools. Further, when the roller is being plated, the working surfaces of the cylindrical roller fit readily into relatively wide molds whose sides are oriented at 90° with each other near the critical working areas, and therefore, it is much easier to obtain a more even distribution of diamonds over the cutting surfaces of this novel roller.

Further, the cylindrical shape of the roller increases its working life because both the radial and axial faces of the roller can be used during the dressing operation. For instance, in the novel dressing method disclosed below, the radially-extending top surface of the roller is used to dress the outside working surface of the grinding wheel, while the circumferential outer surface of the cylinder is used to dress the inside working surface of the grinding wheel. Also, the working life of the roller is enhanced by the fact that its dressing surfaces are stronger, being better supported than the relatively thin ends of either of the known disk-shaped or dish-shaped rollers presently used for contour dressing. In addition, the cylindrical shape of the roller avoids the interference problems referred to above and so permits the dressing of larger inside faces.

In addition to its cylindrical shape, the novel design of the dressing roller of the present invention is readily optimized for dressing grinding wheels in different size ranges. This optimization relates to the radius of the dressing roller and results in approximately equal "effective" radii of curvature of the roller relative to the grinding wheel when dressing both the inside and outside surfaces of the wheel, thereby resulting in greater similarity in the grinding characteristics of both the inside and outside grinding wheel surfaces than has heretofore been provided by the prior art.

BRIEF DESCRIPTION OF THE DRAWINGS

FIGS. 6A and A are schematic representations of the same dressing roller in contact, respectively, with the inner and outer working surfaces of a cup-shaped grinding wheel; and FIG. 6B represents schematically the "effective" radius of curvature of the roller relative to the inner surface of the grinding, while FIG. 7B represents schematically the "effective" radius of curvature of the same roller relative to the outer surface of the wheel;

DETAILED DESCRIPTION OF THE PREFERRED EMBODIMENTS

Figure 1:
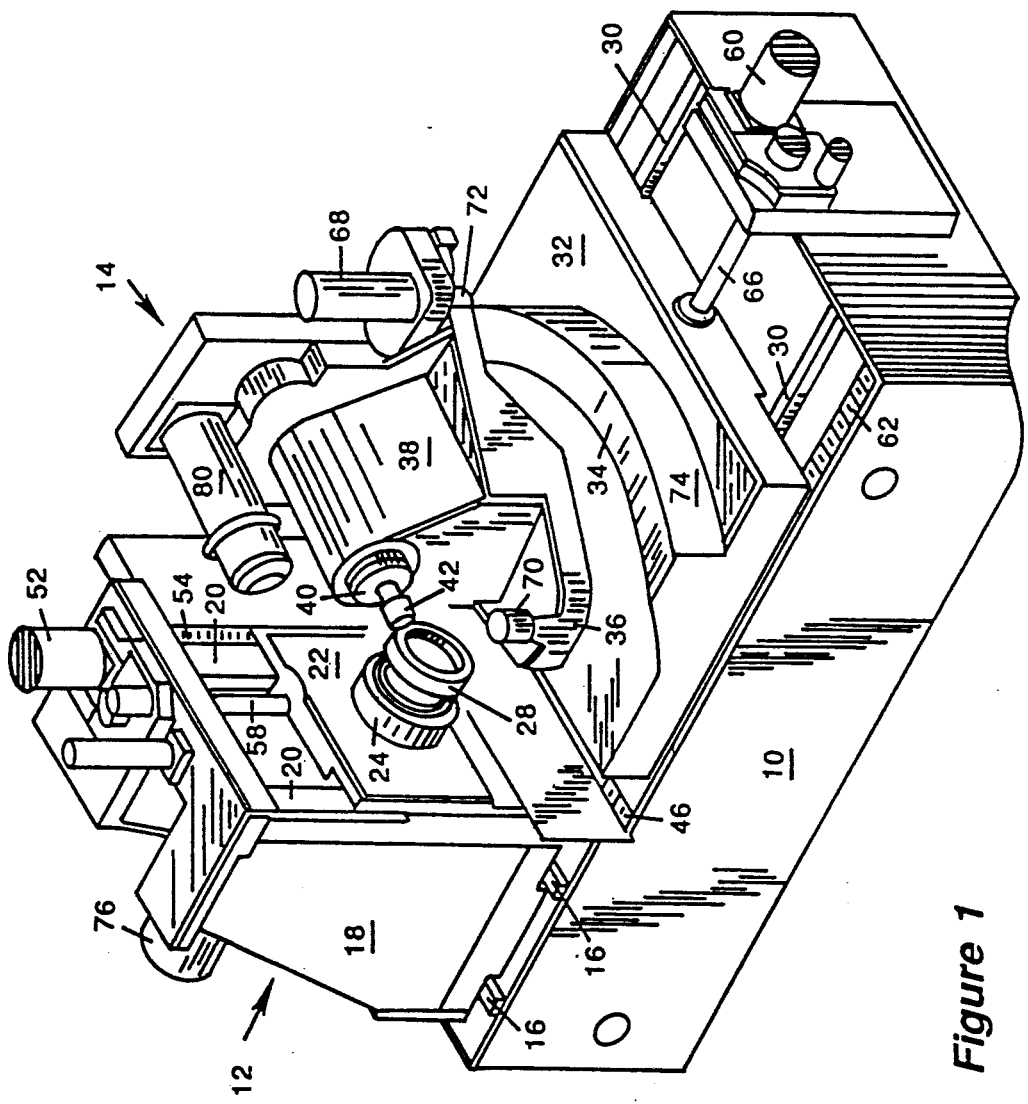
FIG. 1 is a perspective view of a machine incorporating a dressing roller made in accordance with the present invention.
Figure 2:
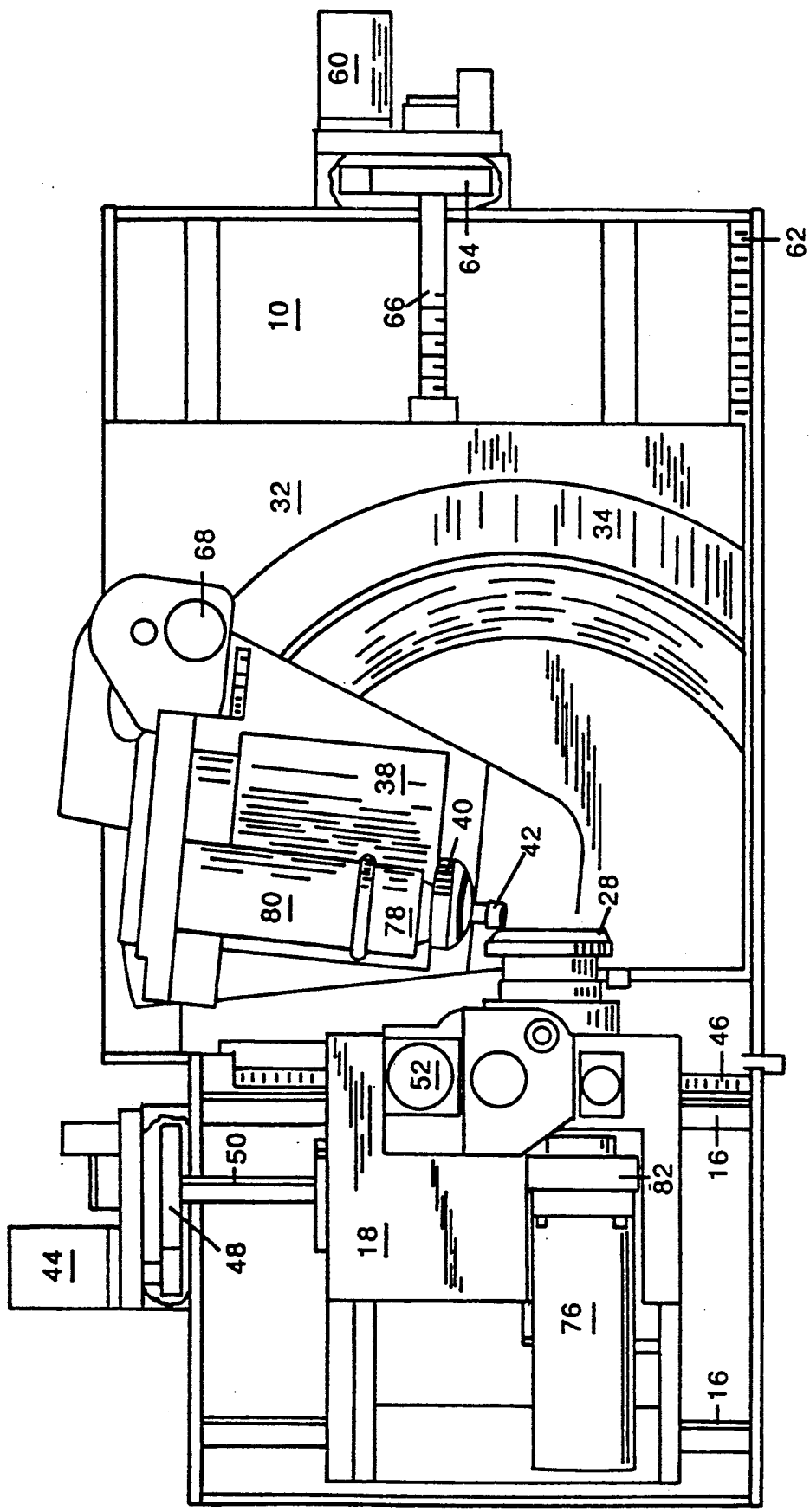
FIG. 2 is a top plan view of the machine illustrated in FIG. 1.

FIGS. 1 and 2 show, respectively, perspective and top views of a multi-axis machine tool for the generating manufacture of bevel and hypoid gears similar to that disclosed in PCT application PCT/US87/02083 and U.S. patent application Ser. No. 104,012 filed Aug. 24, 1987. The machine has a base 10 on which are mounted tool support apparatus 12 and work support apparatus 14. The tool support 12 comprises a carriage 18 mounted on slide 16 formed in base 10 to permit rectilinear movement of carriage 18 across the width of base 10. A tool head 22 is carried on slides 20 in carriage 18 to permit movement of tool head 22 vertically with respect to the base. A tool spindle 24 is journaled in tool head 22 for rotatively mounting a rotary tool having stock-removing surfaces projecting from a front face of the tool. For purposes of this disclosure, the rotary tool is a cup-shaped grinding wheel 28.

Work support 14 includes a table 32 which is mounted on slides 30 formed in base 10 to permit movement of table 32 along the length of the base. A work head 38 is mounted on arcuate slide 34 and pivot 36 on table 32 to permit arcuate movement of work head 38 about pivot 36. A work spindle 40 is journaled in work head 38 for rotatively mounting a work gear blank for being formed into a bevel or hypoid gear.

To simplify the disclosure of the present invention, a cylindrical dressing roller 42 is shown mounted in work spindle 40. However, it should be understood that in actual practice dressing roller 42 could be mounted in a separate and smaller spindle, also carried on work head 38 and mounted so that the second spindle and roller 42 could be pivoted into and out of a dressing orientation as required. Nonetheless, for purposes of this disclosure it will be assumed that grinding wheel 28 requires dressing and dressing roller 42 has been inserted in work spindle 40 for this purpose.

Figure 3:
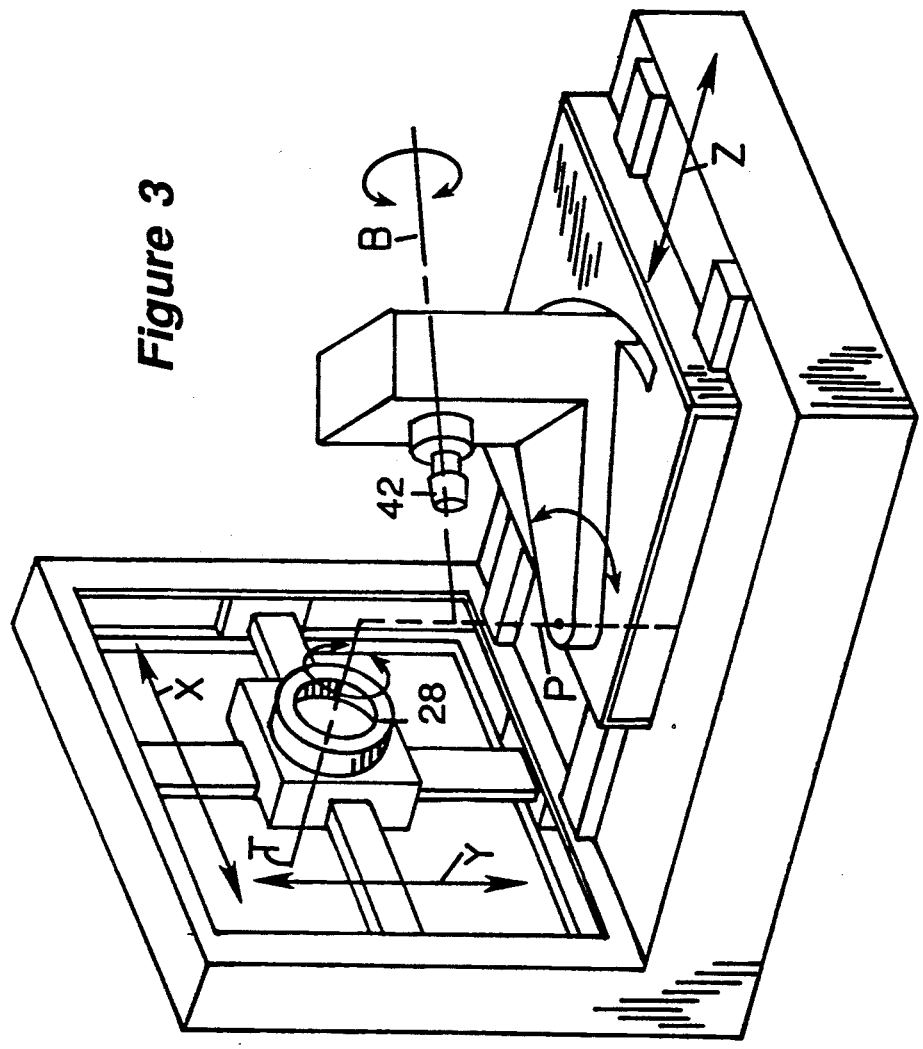
FIG. 3 is a schematic depiction, in perspective, of the machine illustrated in FIGS. 1 and 2, showing the basic machine structures in greatly simplified form to better illustrate the minimal axes of machine movement which provide all of the relative motions necessary to carry out the dressing method disclosed herein.

Reference is made to FIG. 3 to permit a clearer understanding of how all generating operations, including those related to the dressing of grinding wheel 28, are accomplished by the illustrated machine tool. FIG. 3 schematically illustrates the minimal number of axes which are used to carry out all of the machine operations. Further, dressing roller 42 is shown greatly enlarged relative to the schematic representation of the cup-shaped grinding wheel 28. In this regard, it should be noted that dressing roller 42 is also shown enlarged relative to the other machine apparatus in FIGS. 1 and 2.

It can be seen from FIG. 3 that tool axis "T" and roller axis "$\beta$" are movable relative to each other along three rectilinear axes "X", "Y", and "Z", and about one pivot axis "P". Axes X, Y, and Z are mutually orthogonal. Roller axis $\beta$ is pivotable about pivot axis P which extends in direction Y perpendicular to both roller axis $\beta$ and tool axis T. Pivot axis P may intersect work roller axis $\beta$ in a position along roller axis $\beta$ in the vicinity of dressing roller 42, however, roller axis $\beta$ may also be offset from pivot axis P. In the latter instance roller axis $\beta$ and pivot axis P may be perpendicular but not intersecting. Grinding wheel 28 and dressing roller 42 are each rotatable about their associated axes T and β which pass through the respective centers of the tool and dressing roller.

Comparing the schematic representation of FIG. 3 to FIGS. 1 and 2, it may now be understood that axes T and β correspond to the axes of rotation of grinding wheel 28 and dressing roller 42 on tool spindle 24 and work spindle 40, respectively. Movement of carriage 18 across the width of base 10 corresponds to movement of tool axis T in direction X. Similarly, movement of tool head 22 vertical of the base, and movement of work head 38 along the length of the base, correspond respectively to movements of tool axis T in direction Y and roller axis β in direction Z. Pivot axis P may be understood to extend through pivot 36 on table 32 in a direction parallel to the movement of tool head 22 in direction Y.

Rectilinear movement of tool support 12 and work support 14 is imparted by respective drive motors which act through speed reducing gearing and recirculating ball screw drives. For example, movement of table 32 in direction Z along the length of the base is imparted by drive motor 60 which is operatively connected to threaded ball screw 66 through reduction 64. In accordance with conventional practices, ball screw 66 is threadably engaged with a ball nut (not shown) which is captured in table 32. Threaded ball screw 66 is secured axially to base 10 and its rotation is transformed by the ball nut into a rectilinear movement of table 32.

Similarly, rectilinear movement of carriage 18 in direction X is imparted by drive motor 44 acting through reduction gearing 48 and ball screw 50. Tool head 22 is moved in direction Y by drive motor 52, reduction gearing (not shown) and ball screw 58. Arcuate motion of work head 38 is imparted by drive motor 68 acting through friction wheel 72 which contacts outer surface 74 of slide 34 which partly encircles pivot 36 at a fixed radial distance. The axis of friction wheel 72 is fixed to work head 38 and rotation of the friction wheel in contact with outer surface 74 of slide 34 advances one end of the work head around pivot 36. Drive motors 76 and 80 are also provided for rotating the grinding wheel and dressing roller, respectively.

Each of the respective drive motors is associated with either a linear or rotary encoder as part of a CNC system which governs the operation of the drive motors in accordance with instructions input to a computer. The encoders provide feedback information to the computer concerning the actual positions of each of the movable machine axes.

For example, movement of carriage 18 on slides 16 is measured by linear encoder 46, movement of tool head 22 in slides 20 is measured by linear encoder 54, and movement of table 32 on slides 30 is measured by linear encoder 62. Arcuate movement of work head 38 about pivot 36 is measured by rotary encoder 70. Rotary encoders 78 and 82 are also provided for measuring the rotational positions of work spindle 40 and tool spindle 24, respectively.

Although the illustrated apparatus for carrying out the method of the invention includes a particular arrangement of movable structures for relatively positioning the grinding wheel and dressing roller, many other arrangements may be used to provide the same freedoms of adjustment. Accordingly, it would be possible to provide for moving either the work support or tool support relative to the other along any of the prescribed axes. For example, any of the rectilinear axes may be associated with movements of the tool support or work support, and either the tool support or work support may be pivoted with respect to the other.

An appropriate CNC system (not shown) for governing the operation of the respective drive motor is provided. First, a system is provided with appropriate computer hardware and software for controlling the respective operation of the device in accordance with predetermined motion. Thus, the appropriate information for generating the appropriate dressing condition of any predetermined grinding wheel and dressing roller can be programmed such that operation of a machine is totally automated.

Figure 4:
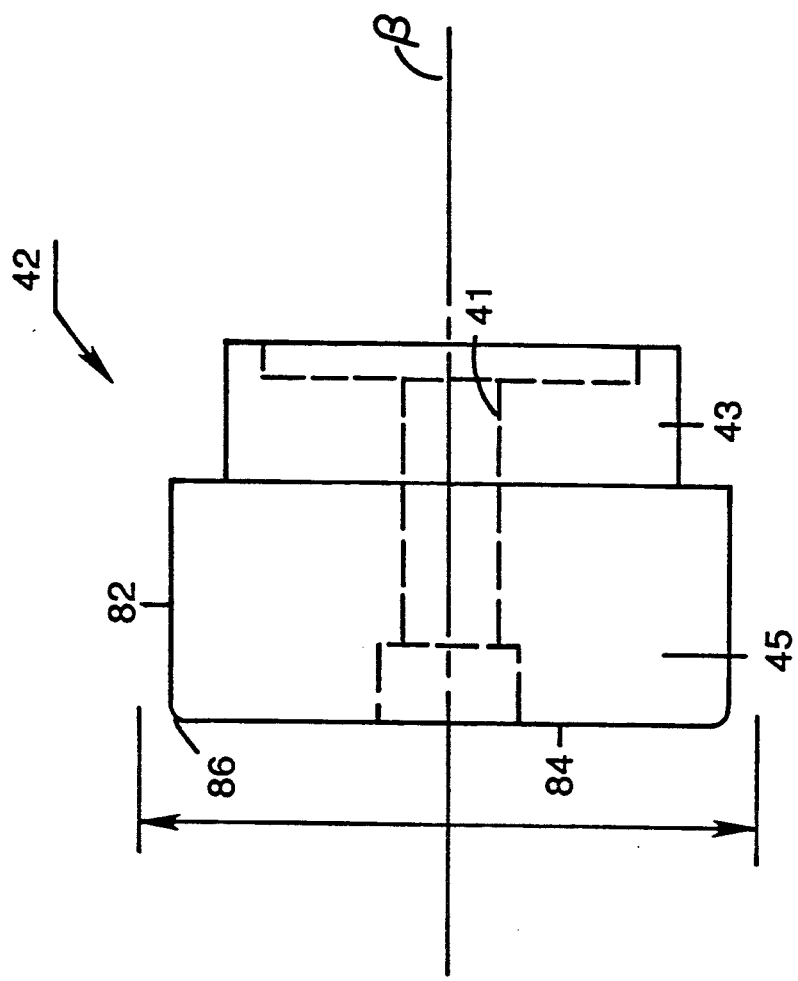
FIG. 4 is a side elevational view of a cylindrical dressing roller according to the invention.

In FIG. 4, dressing roller 42 is shown in an enlarged side elevational view. Dressing roller 42 includes a base or end portion 43 which is mountable in a spindle (e.g., work spindle 40 in FIGS. 1 and 2) in any conventional manner. For instance, in the particular embodiment illustrated, dressing roller 42 is provided with an axial, centrally located, opening 41 for receiving a retaining bolt (not shown) for securing roller 42 in a spindle in a well known manner. Formed at one end of base portion 43 is the cylindrical working portion 45 of roller 42. Working portion 45 includes a cylindrical outer surface 82 and an end surface 84 which extends radially perpendicular to roller axis β. A radiused rim portion 86 interconnects cylindrical outer surface 82 and radially extending end surface 84. Radiused rim portion 86 and the portions of surfaces 82 and 84 contiguous with rim portion 86 are covered with a thin layer of abrasive material normally used for dressing grinding wheels, generally diamond grit, bonded to the surface of the roller.

As has been noted above, it is known to use disk-shaped rollers for dressing cup-shaped wheels and, theoretically, a disk is an extreme form of cylinder in which the length of the cylinder is a very small percentage of its width. For instance, the length of such a prior art disk roller is only approximately 2% of its diameter, e.g., a 3-inch dressing disk having an outer edge which is only 0.06 inch long. In contrast, the invention herein contemplates the use of cylindrical dressing rollers designed so that the length of cylindrical outer surface 82 is substantially 10% or more of the diameter of radially extending end surface 84.

Figure 5:
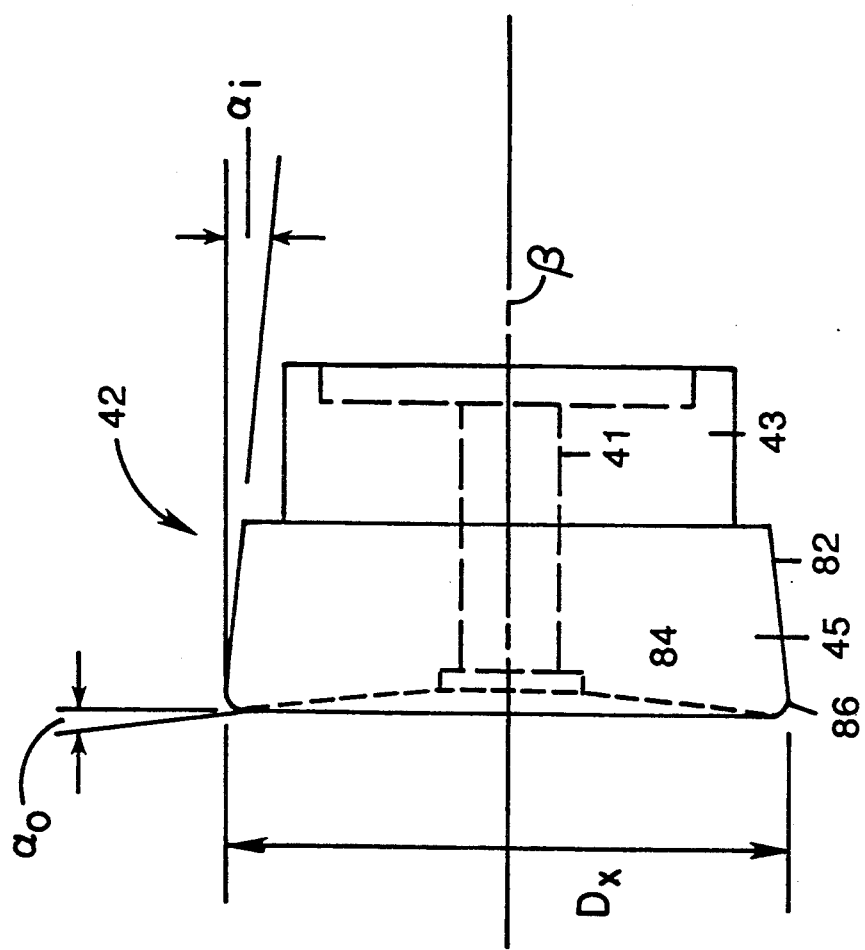
FIG. 5 is an enlarged side elevational view of a possible minor modification of the cylindrical dressing roller illustrated in FIG. 4.

Referring next to FIG. 5, dressing roller 42 is shown in an enlarged and schematic side elevational view to show a possible minor modification of the basic cylindrical shape of the roller which, while not preferred, would be an embodiment fully in accordance with the concept of the invention herein. Namely, the normally perpendicular working surfaces 82 and 84 of the cylindrical portion 45 of roller 42 can be modified slightly to incorporate the clearance angles $a_i$ and $a_o$ which must be maintained between roller surfaces 82 and 84 when dressing, respectively, the inside and outside working surfaces of a cup-shaped grinding wheel. These clearance angles will be referred to in greater detail below.

As indicated above and as is well known in the art, when dressing grinding wheels, the grinding characteristics of the dressed wheel are affected by the "effective radius of curvature" of the dressing roller relative to the surface of the grinding wheel being dressed. This "effective radius" is a mathematical term which makes it possible to compare the dressing of differently curved surfaces by the same or differently-sized rollers. This comparison treats the surface of the grinding wheel as if it were a plane and attributes all of the relative curvatures between the roller and the grinding wheel as if they were found on the roller alone. In FIG. 6A, dressing roller 42 is shown (schematically) positioned to dress the inside working surface of cup-shaped grinding wheel 28, the surfaces of the roller and wheel meeting at a point of contact 88. It can be seen that the radius 90 of roller 42, measured from point 88, is smaller than the radius 92 of the inside working surface of grinding wheel 28. Therefore, the curvature of roller 42 is greater than the curvature of grinding wheel 28. That is, the smaller the radius, the greater the curvature and visa versa, and for this reason curvature is defined mathematically as the reciprocal of radius.

In order to determine the effective radius of curvature, it is necessary to treat the surface of grinding wheel 28 as if it were a plane (i.e., as if its curvature were zero). This can be more easily understood if values are assigned to the two curvatures being discussed. If it is assumed that roller radius 90 equals 3 units and inside radius 92 of grinding wheel 28 is equal to 5 units, then the respective curvatures are, respectively, $\frac{1}{3}$ and 1/5. To calculate the effective curvature between these two surfaces, the grinding wheel is first mathematically rolled out into a plane, its curvature being converted to "0" by the addition of a curvature of $-1/5$. Next, in order to apply all curvature to the roller, the curvature removed from the wheel is added to that of the roller. Therefore, the effective curvature of the roller relative to the inside of the grinding wheel becomes $$C_{ei} = \tfrac{1}{3} + (-1/5) = 2/15. \tag{1}$$

Since radius is the reciprocal of curvature, in this hypothetical example the effective radius of curvature of the roller relative to the inside of the grinding wheel is $$R_{ei} = 1/C_{ei} = 15/2 = 7.5.$$

Figure 6B:
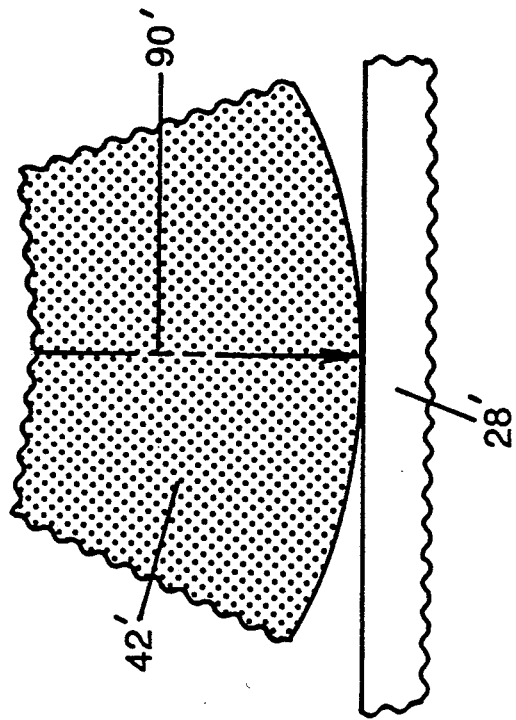
FIGS. 6A, 6B, 7A, and 7B are diagrammatic representations of the mathematical concept of "effective radius of curvature" and are provided to facilitate understanding of an important improvement incorporated in the disclosed invention.
Figure 6A:
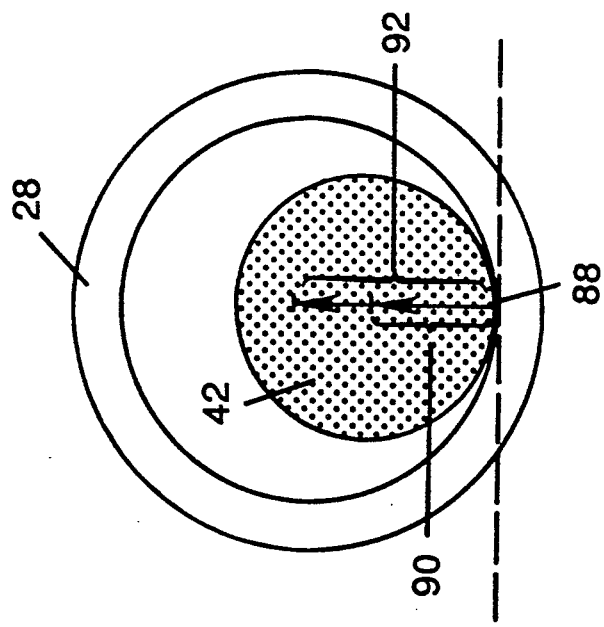

This effective radius of curvature is shown in FIG. 6B as radius 90' of roller 42'.

Figure 7B:
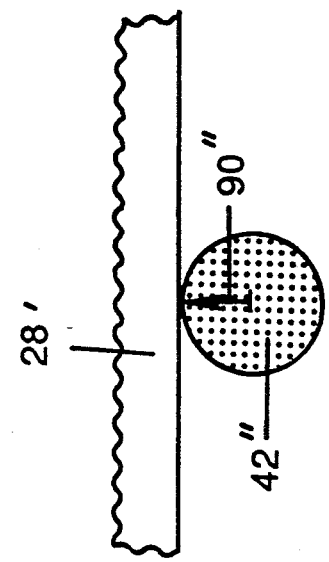
Figure 7A:
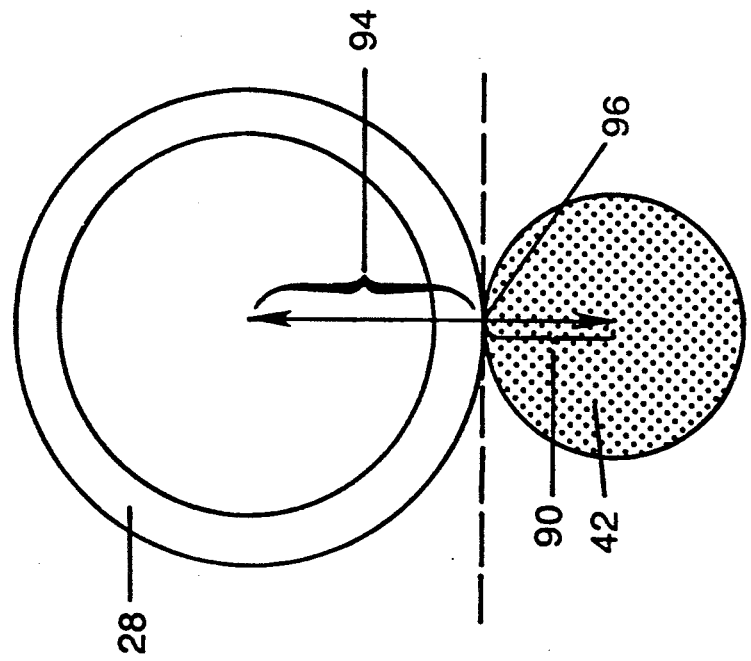

In FIG. 7A, roller 42 is shown (schematically) positioned to dress the outside of cup-shaped wheel 28, the roller and wheel contacting at point 96. Again, let it be assumed that roller 42 has a radius of 3 units, while the outside surface of roller 28 has a radius of 6 units. However, in this instance the curvatures are opposite to each other and so, mathematically, if one is treated as being positive, the other must be treated as negative. If the roller curvature is treated as positive, then the curvature of the roller is $\frac{1}{3}$, while the curvature of the outside surface of the grinding wheel is $-1/6$. To convert the outer surface of wheel 28 into a plane, $+1/6$ must be added to its curvature ($-1/6 + 1/6 = 0$). Adding this curvature to that of the roller to calculate the total effective curvature of the roller relative to the outside surface of the wheel:

$$C_{eo} = \tfrac{1}{3} + 1/6 = \tfrac{1}{2}. \tag{3}$$

And, again, the effective radius of curvature of the roller relative to the outside surface of the grinding wheel becomes $$R_{eo} = 1/C_{eo} = 2. \tag{4}$$

This is represented schematically in FIG. 7B as radius 90''. Comparing FIGS. 6B and 7B, it can be seen that when dressing the inside of the grinding wheel, roller 42 has a relatively large effective radius of curvature (indicated schematically by roller 42'), while this same dressing roller 42 has a much smaller effective radius of curvature (as shown schematically by roller 42'') when dressing the outside of the grinding wheel.

As noted above, when the effective radius of curvature of the dressing roller is relatively small, the grinding characteristics dressed into the wheel are sharper, while the dressed characteristics of the wheel become duller and more polished as the effective radius of the roller increases. Therefore, as has just been demonstrated above, when the radius of the dressing roller is of the same size for dressing both the inside and outside surfaces of the grinding wheel, this results in widely divergent "effective" radii of curvature and, thus, widely divergent grinding characteristics being dressed into the inside and outside working surfaces of the grinding wheel. By specially designing the cylindrical dressing roller according to the invention herein, it is possible to use the same dressing roller to dress both the inside and outside surfaces of the grinding wheel in a manner in which the effective radii of curvature are substantially equal. Also, the present invention allows for the dressing roller to have a smaller radius of curvature than the prior art wherein the grinding wheel was dressed with a dressing roller in a single position. A smaller radius of curvature tends to sharpen the grinding characteristics dressed into the grinding wheel, as mentioned above, and it also allows a particular dressing roller diameter to cover a larger range of grinding wheel diameters.

In order to be able to design roller 42 in accordance to the invention, it is first necessary to determine the "instant" radii of the surfaces of revolution (of both the dressing roller and the wheel) as these surfaces contact each other during each of the dressing operations. Since each of the working surfaces of the grinding wheel have different pressure angles (i.e., since these working faces are not parallel to the axis of the grinding wheel), the "instant" radius of the grinding wheel, measured normal to the point of contact between the dressing roller and the grinding wheel, is not the same as the "actual" radius of the grinding wheel, measured from the point of contact perpendicular to the axis of the grinding wheel. Similarly, since the outer cylindrical surface of the dressing roller is not laid flat against the surface of the grinding wheel but, rather, contacts the grinding wheel at some predetermined clearance angle as a means of controlling the size of the contact area between the roller and the grinding wheel and to permit cutting fluid to cool the contact area and remove grinding detritus, the actual radius of the dressing tool is not the same as the instant radius of the dressing tool normal to its point of contact with the wheel.

Figure 8:
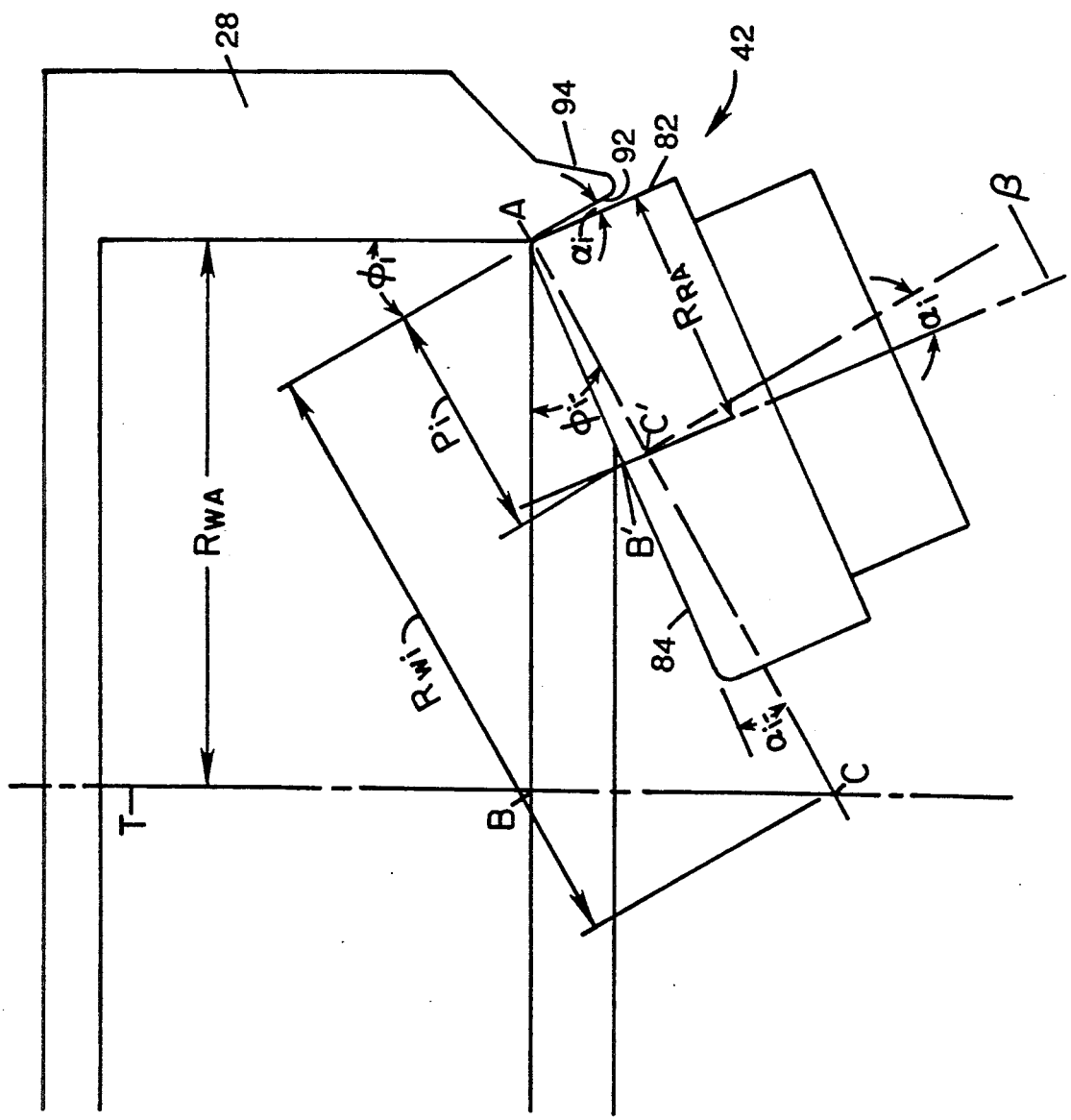
FIG. 8 schematically illustrates, in an enlarged side elevational view, the cylindrical dressing wheel of FIG. 4 contacting the inside working surface of the grinding wheel shown mounted on the machine in FIG. 1.

In FIG. 8, dressing roller 42 is shown with its cylindrical outer surface 82 contacting inside working surface 92 of grinding roller 28 at point A, said surfaces meeting at a clearance angle $o\alpha_i$. Inside surface 92 of wheel 28 is not parallel to grinding wheel axis T but, rather, is inclined thereto at pressure angle $\phi_i$. When positioned in this orientation by the apparatus of the invention, grinding wheel 28 and dressing roller 42 each rotate about their respective axes of rotation T and $\beta$, and their respective "instant" radii of rotation are measured by lines normal to point of contact A and extending to their respective axes. As just explained above, these "instant" radii of rotation must be distinguished from their "actual" radii of rotation which are measured from point A by lines perpendicular to their respective axes.

Therefore, in FIG. 8, the actual radius of rotation of grinding wheel 28 at point A is measured by the line $R_{WA}$, while the actual radius of rotation of roller 42 at point A is represented by the line $R_{RA}$, and the instant radii of rotation of the wheel and dresser at point A are measured, respectively, by lines $R_{Wi}$ and $P_i$.

Figure 9:
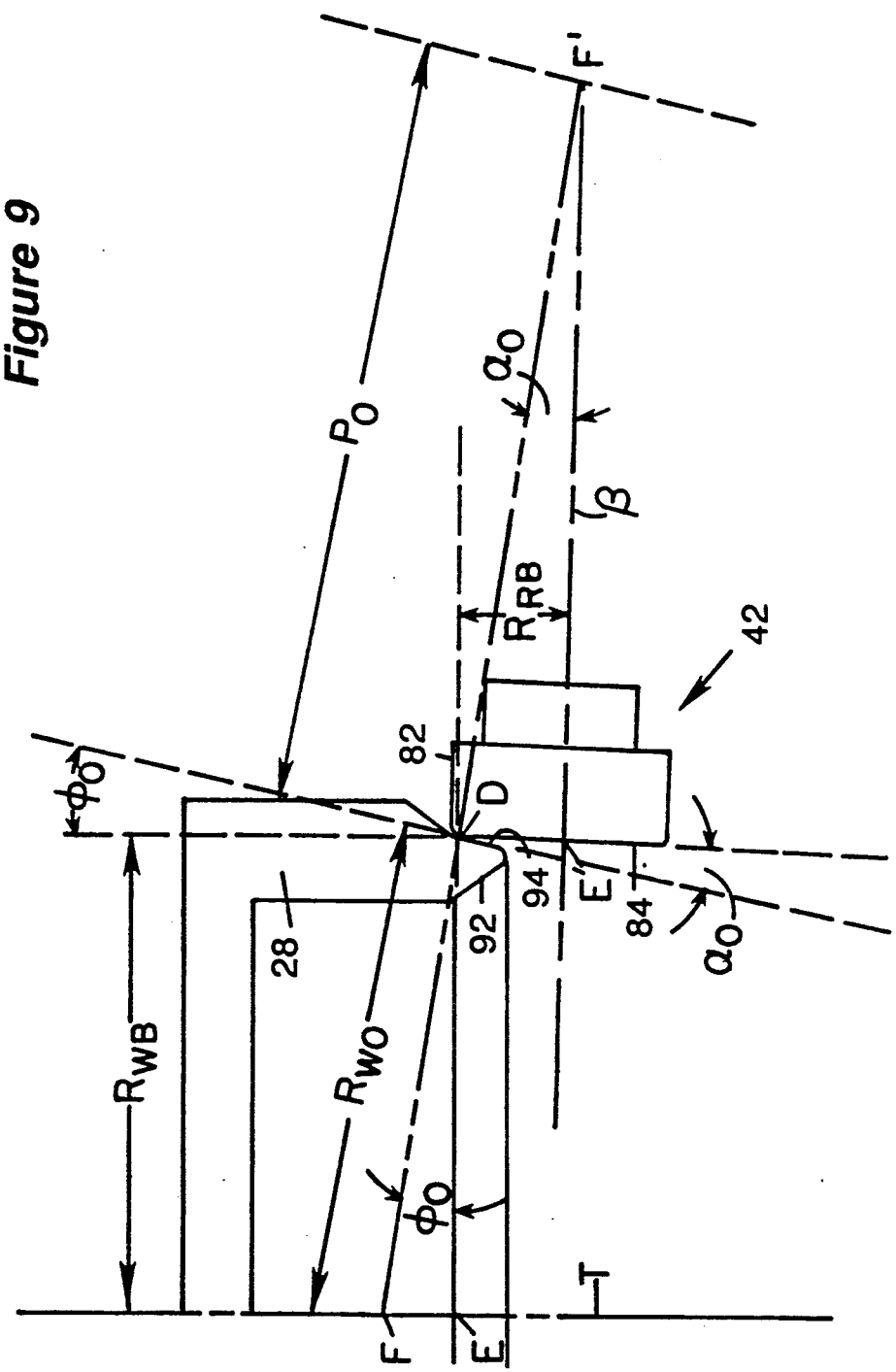
FIG. 9 is a schematic illustration of the same cylindrical dressing roller and grinding wheel shown in FIG. 8 with the dressing roller contacting the outer working surface of the grinding wheel.

Similarly, the instant and actual radii of rotation of the grinding wheel and the dressing roller have different values when the outside of the wheel is being dressed. In FIG. 9, outside working surface 94 of wheel 28 has a pressure angle of $\phi_o$. Dressing roller 42 is now oriented so that its radially extending end surface 84 is contacting wheel surface 94 at point D at a clearance angle $a_o$. Again, the actual radii of rotation of the wheel and roller are measured from point D perpendicular to their respective axes. The actual radius of rotation for roller 42 being represented by line $R_{RB}$, and the actual radius of grinding wheel 28 is indicated by the line $R_{WB}$, while the instant radii of rotation for the dressing roller and wheel are, respectively, represented by lines $P_o$ and $R_{WO}$.

Since the actual radii of rotation of the grinding wheel and roller can be readily measured (or are known from the manufacturer's specifications), it is possible to calculate the instant radii of rotation which, in turn, can be used to determine the "effective" radii of curvature of the dressing roller relative to the wheel. Referring again to FIG. 8, instant radius $R_{Wi}$ of wheel 28 is the hypotenuse of triangle ABC. Since angle BAC is equal to pressure angle $\phi_i$, and since line AB is equal to actual wheel radius $R_{WA}$:

$$R_{WA}/R_{Wi} = \cos \phi_i \qquad (5)$$

$$R_{Wi} = R_{WA}/\cos \phi_i \qquad (6)$$

Similarly, instant radius $P_1$ of roller 42 is the hypotenuse of triangle AB'C' Since angle B'AC' is equal to clearance angle $\phi_i$, and since line AB' is equal to actual roller radius $R_{RA}$ $$R_{RA}/P_i = \cos a_i \qquad (7)$$

$$R_i = R_{RA}/\cos \phi_i \qquad (8)$$

Next, the instant radii of rotation can be similarly calculated for the dressing of outside working surface 94 of grinding wheel 28. Referring to FIG. 9, instant radius $R_{WO}$ of wheel 28 is the hypotenuse of triangle DEF. Again, angle FDE is equal to pressure angle $\phi_o$, and since line DE is equal to actual radius $R_{WB}$:

$$R_{WB}/R_{WO} = \cos \phi_o \qquad (9)$$

$$R_{WO} = R_{WB}/\cos \phi_o \qquad (10)$$

Instant radius $P_o$ of wheel 42 is the hypotenuse of triangle F'E'D. Since angle E'F'D is equal to clearance angle $a_o$, and since line DE' is equal to actual roller radius $R_{RB}$:

$$R_{RB}/P_o = \sin a_o \qquad (11)$$

$$P_o = R_{RB} \sin a_o \qquad (12)$$

It is now possible to calculate the effective radii of curvature of roller 42 relative to each of the working surfaces of grinding wheel 28. This will be done using the terms derived above and the same procedure described earlier. Since curvature is the reciprocal of the instant radius of rotation, the effective curvature for the inside of the wheel is determined by adding, in the manner indicated in equation (1) above, the reciprocals of the respective instant radii of rotation from equations (6) and (8), namely:

$$C_{ei} = \cos a_i/R_{RA} - \cos a_i/R_{WA} \qquad (13)$$

and the effective curvature when dressing the outside of the wheel, using the reciprocals of the radii of rotation from equations (10) and 12), becomes:

$$C_{eo} = \sin a_o/R_{RB} + \cos \phi_o/R_{WB} \qquad (14)$$

Equations (13) and (14) will be used below in regard to optimizing the design of dressing roller 42.

Next, further details relating to the dressing methods of the invention will be explained with reference to FIG. 10 in which the cutting surfaces of dressing roller 42 are shown in greatly enlarged schematic form. Superimposed in this enlarged schematic diagram are two different views of grinding wheel 28 depicting both inside working surface 92 and outside working surface 94 of grinding wheel 28, each shown in the same relative position to roller 42 as was disclosed above in FIGS. 8 and 9, respectively. Outer cylindrical surface 82 of roller 42 is shown contacting inside wheel surface 92 at point of contact A, while end surface 84 of roller 42 is shown contacting outside surface 94 at point D.

The novel method and cylindrical roller disclosed herein differ from the prior art in that the grinding wheel is not dressed by a single radiused surface of the roller but, rather, by two separate, relatively elongated surfaces. In a manner similar to that disclosed in U.S. Pat. No. 4,862,868, when dressing roller 42 is first brought into contact with inside surface 92 of grinding wheel 28, roller 42 is positioned so that its initial contact with the wheel occurs above point A (i.e., to the left of point A in FIG. 10). Since point A is preselected as the point of maximum working depth of inside working surface 92, roller 42 first contacts grinding wheel 28 at a point which is just outside of the region of the working surface used for the grinding of gear teeth. At the time of this initial contact roller 42 is fed in along an arcuate path to its desired dressing depth, for instance, 0.025 mm (0.001 inch), and thereafter it is moved outward toward the tip of the grinding wheel, in the direction indicated by arrow 100, dressing the inside working surface as it moves along. The dashed line 102 indicates the resulting shape of inside working surface 92 following the dressing operation. It should be noted that during the actual dressing of the inside working surface 92, dressing roller 42 makes contact with the inside working surface 92 of the grinding wheel within zone $Z_i$. This is the area of outer surface 82 which is contiguous with its intersection with radiused rim portion 86. It is this same relatively extended area of outer surface 82 which is used to remove a substantial portion of the abrasive material on grinding wheel 28 as the dressing roller moves along in the direction of line 100 during the dressing operation. Therefore, the greatest wear to dressing roller 42 occurs along the portion of roller surface 82 which is located in front of its point of final contact with the grinding wheel (e.g., at point A), thereby helping to preserve the diamond grit at the critical area of the roller's outside surface 82 which produces the final shape on the inside of the grinding wheel.

Similarly, when dressing outside surface 94 of grinding wheel 28, end surface 84 of roller 42 is fed in along an arcuate path to its desired dressing depth at a point above point D and, thereafter, is moved in the direction of arrow 104 to dress outside surface 94 as indicated by dashed line 106. Again, a fairly wide zone of contact (within the circle $Z_o$) of end srrface 84 of roller 42 makes both the initial contact and the dressing contact with grinding wheel 28, helping to preserve the diamond grit in the critical area of the roller's top surface which is used to produce the final shape on the outside of the grinding wheel.

Figure 10:
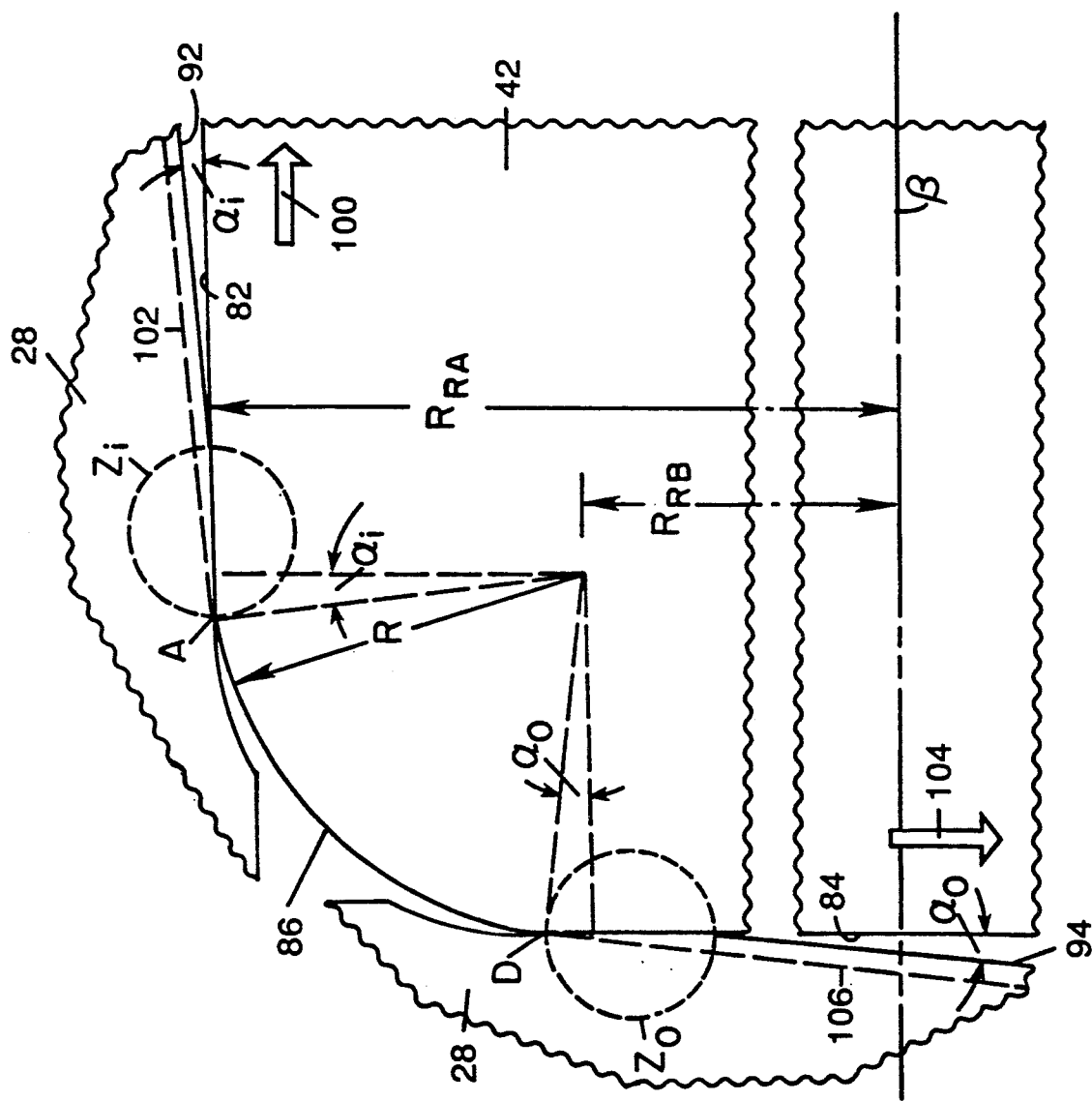
FIG. 10 illustrates in greatly enlarged schematic form, the radiused intersection of the outer cylindrical surface and the radially-extending top surface of the dressing roller of FIG. 4, also showing, superimposed in this same schematic drawing, the points of contact of the dressing roller with both the inside and outside working surfaces of the grinding wheel as shown in FIGS. 8 and 9, respectively.

Also referring to FIG. 10, radiused rim portion 86 of dressing roller 42 is shown in greater detail than in FIGS. 8 and 9, and it can be seen that if the radius of rim portion 86 is equal to R, then:

$$R_{RB} = R_{RA} - R \tag{15}$$

This relationship is used when determining the optimum design of cylindrical roller 42.

In order to optimize the "effective" radius of curvature of roller 42 relative to both the inside and outside working surfaces of grinding wheel 28, it is necessary to select an appropriate radius $R_{RA}$ (i.e., the actual radius of outer cylindrical surface 92 of roller 42) which will result in substantially equal effective radii of curvature. That is, it is desired that:

$$C_{ei} = C_{eo} \tag{16}$$

and using the values determined above in equations (13) and (14), equation (16) can be rewritten as follows:

$$\frac{\cos \phi_i}{R_{RA}} - \frac{\cos \phi_i}{R_{WA}} = \frac{\sin \alpha_o}{R_{RB}} + \frac{\cos \phi_o}{R_{WB}} \tag{17}$$

Equation (17) can be solved in terms of $R_{RA}$ by substituting the value for $R_{RB}$ in equation (15), and by using the known actual radii of the inside and outside working surfaces of the grinding wheel, the pressure angles of those surfaces, and the desired clearance angles. In regard to these known terms, it should be noted that R (the radius of rim portion 86 of dressing roller 42) is generally about four to about ten times the diamond size for known dressing and grinding conditions, while the clearance angle $\alpha$ is often the same for dressing both the inside and outside surfaces of the grinding wheel, such clearance angle being at least 2°, and preferably in the range of 2° to 6°. The pressure angles and actual radii of the working surfaces of the grinding wheel are known from the manufacturer's specifications.

Equation (17) can be solved exactly for $R_{RA}$ with the use of the quadratic formula. However, with the use of two approximations, equation (17) can be greatly simplified to provide a solution which is fully appropriate for practical commercial use. The first of these assumptions relates to the fact that the value R is extremely small relative to the radii $R_{RA}$ and $R_{RB}$, and so R can be treated as being equal to zero with very little practical effect on the solution. The second assumption is based upon the fact that the differences between the actual radii of the inside and outside working surfaces of the cup-shaped grinding wheel can be averaged without seriously affecting the validity of this commercial simplification. These two assumptions can be summarized mathematically as follows:

$$R = 0 \rightarrow R_{RA} = R_{RB} \tag{18}$$

$$R_{AV} = \frac{R_{WA} + R_{WB}}{2} \tag{19}$$

these assumptions to the solution of equation (17), the simplified practical formula becomes:

$$R_{RA} = \frac{R_{AV}(\cos \alpha_i - \sin \alpha_o)}{\cos \phi_o + \cos \phi_i} \tag{20}$$

In reference to the term $R_{AV}$, if the cup-shaped grinding wheel used for this approximation is selected from the middle of a range of relatively similar wheels, the calculated radius will provide a dressing roller design which will result in substantially equal "effective" curvatures when dressing the inside and outside surfaces of wheels within the range.

From the above, it will be appreciated that the invention herein provides several important new advantages. The new dressing roller is much simpler and less expensive to manufacture. Also, since relatively wide portions of two different surfaces are used for dressing operations (as compared to the single, relatively narrow radiused surface used in most prior art systems), and since the novel cylindrical roller provides greater stability to each of its dressing surfaces, both life and dressing accuracy are improved Further, a reduced number of dressing rollers, varying from one another only in diameter, may be used to dress a full range of cup-shaped wheel geometries, and the diameters of these dressing rollers can be selected to provide substantially equal "effective" curvatures of the roller relative to both sides of the grinding wheels being dressed. Finally, selection of an optimum radius for the cylindrical dressing roller is greatly simplified by the use of the equations derived above.

What is claimed is:

1. A tool mountable for rotation about an axis for contour dressing both the inside and outside working surfaces of a cup-shaped wheel used for grinding gear teeth, said tool being formed in the shape of a cylinder having
   (a) its cylindrical outer surface parallel to said axis,
   (b) a base at a first end of said cylinder for mounting the tool in a dressing apparatus,
   (c) an end surface perpendicular to said axis and forming a second end of said cylinder, and
   (d) a radiused rim portion interconnecting said
   said tool being provided with two dressing surfaces, the first of said dressing surfaces comprising part of said cylindrical outer surface contiguous with said rim portion and being adapted to dress one of said working surfaces of said grinding wheel, and the second of said dressing surfaces comprising part of said end surface contiguous with said rim portion and being adapted to dress the other of said working surfaces of said grinding wheel.

2. The dressing tool of claim 1 wherein the length of said cylinder is substantially 10% or more of its diameter.

3. The dressing tool of claim 1 wherein the effective radius of curvature of said first dressing surface of said dressing tool relative to said one working surface of said grinding wheel is substantially equal to the effective radius of curvature of said second dressing surface of said dressing tool relative to said other working surface of said grinding wheel, whereby the dressing of said grinding wheel by said tool produces similar cutting characteristics on both said inside and outside surfaces of said grinding wheel.

4. The dressing tool of claim 1 wherein said cylindrical shape is designed in accordance with the following relationships:

$$\frac{\cos \alpha_i}{R_{RA}} - \frac{\cos \phi_i}{R_{WA}} = \frac{\sin \alpha_o}{R_{RB}} + \frac{\cos \phi_o}{R_{WB}} \text{ and}$$

$$R_{RA} = R_{RB} + R$$

wherein:

$R_{RA}$ is the actual radius of said cylindrical outer surface of the dressing tool measured to its point of contact with the inside working surface of said grinding wheel;

$R_{RB}$ is the actual radius of said end surface of the dressing tool measured to its point of contact with the outside working surface of said grinding wheel;

$R_{WA}$ is the actual radius of the inside working surface of said grinding wheel measured to its point of contact with said dressing tool;

$R_{WB}$ is the actual radius of the outside working surface of said grinding wheel measured to its point of contact with said dressing tool;

$\alpha_i$ is the clearance between the outer cylindrical surface of the dressing tool and the inside working surface of the grinding wheel;

$\alpha_o$ is the clearance between the end surface of the dressing tool and the outside working surface of the grinding wheel;

$\phi_i$ is the pressure angle of the inside working surface of said grinding wheel;

$\phi_o$ is the pressure angle of the outside working surface of said grinding wheel; and R is the corner radius of the rim portion interconnecting the outer cylindrical and end surfaces of said dressing tool.

5. The dressing tool of claim 4 wherein said first relationship is simplified to:

$$R_{RA} = \frac{R_{AV}(\cos \alpha_i + \sin \alpha_o)}{\cos \phi_o + \cos \phi_i}$$

and wherein:

$$R_{AV} = \frac{R_{WA} + R_{WB}}{2}$$

6. An apparatus for dressing a cup-shaped grinding wheel mounted on a machine for grinding teeth on a gear-shaped workpiece, said apparatus including a dressing tool mounted for rotation about an axis adjustable to preselected angular orientations relative either to the inside or outside working surfaces of said cup-shaped grinding wheel, the improvement wherein said dressing tool is formed in the shape of a cylinder having an outer cylindrical surface parallel to said axis, an end surface extending radially from said axis, and a radiused rim portion connecting said parallel and radially-extending surfaces; and wherein said cylindrical tool is positioned so that, when dressing the inside working surface of said grinding wheel, part of said outer cylindrical surface contiguous with said rim portion contacts the grinding wheel, and further, when dressing the outside working surface of said grinding wheel, part of said radially-extending end surface contiguous with said rim portion contacts the grinding wheel.

7. The apparatus of claim 6 wherein, when said surfaces of the dressing tool are oriented, respectively, relative to said working surfaces of the grinding wheel, predetermined clearance angles are provided between the respective surfaces of said tool and said wheel.

8. Dressing apparatus for a machine tool having a first column with a spindle for rotatably holding a cup-shaped wheel with inside and outside working surfaces for grinding teeth on a workpiece rotatably held in a second spindle mounted on a second column, said columns of the machine tool being movable relative to each other along a minimum number of operational axes, namely, three mutually orthogonal rectilinear axes and one pivot axis; said dressing apparatus comprising, a cylindrical dressing roller mounted on said second column for rotation about an axis and having (a) an outer cylindrical dressing surface parallel to said axis for dressing one of said working surfaces of said grinding wheel, (b) an end dressing surface extending radially from said axis for dressing the other working surface of said grinding wheel, and (c) a radiused rim portion between said cylindrical and end surfaces.

9. The dressing apparatus of claim 8 wherein the columns of said machine tool are oriented relative to each other along said operational axes so that (a) when said roller is dressing one of said working surfaces, the cylindrical outer surface of said roller contacts said wheel, and (b) when said roller is dressing the other of said working surfaces, the radially extending end surface of said roller contacts said wheel.

10. The dressing apparatus of claim 8 wherein said cylindrical dressing roller is designed with the radius of its cylindrical outer surface and the radius of its rim portion being selected so that, when dressing said grinding wheel, the effective radius of curvature of said roller relative to the inside working surface of said grinding wheel is substantially equal to said roller's effective radius of curvature relative to the outside working surface of said grinding wheel.

11. The dressing apparatus of claim 8 wherein the inside working surface of said grinding wheel has a pressure angle $\phi_i$, the outside working surface of said grinding wheel has a pressure angle of $\phi_o$, and the radius of the cylindrical outer surface of said cylindrical dressing roller ($R_{RA}$) and the radius of said rim portion (R) are selected in accordance with the following relationships:

$$\frac{\cos \alpha_i}{R_{RA}} - \frac{\cos \phi_i}{R_{WA}} = \frac{\sin \alpha_o}{R_{RB}} + \frac{\cos \phi_o}{R_{WB}} \text{ and}$$

$$R_{RA} = R_{RB} + R$$

wherein:

$R_{RA}$ is the actual radius of said cylindrical outer surface of the dressing roller measured to its point of contact with the inside working surface of said grinding wheel;

$R_{RB}$ is the actual radius of said end surface of the dressing roller measured to its point of contact with the outside working surface of said grinding wheel;

$R_{WA}$ is the actual radius of the inside working surface of said grinding wheel measured to its point of contact with said dressing roller;

$R_{WB}$ is the actual radius of the outside working surface of said grinding wheel measured to its point of contact with said dressing roller;

$a_i$ is the clearance between dressing roller and the inside working surface of the grinding wheel;

$a_o$ is the clearance between dressing roller and the outside working surface of the grinding wheel;

$\phi\text{hd } i$ is the pressure angle of the inside working surface of said grinding wheel;

$\phi_o$ is the pressure angle of the outside working surface of said grinding wheel; and R is the corner radius of the rim portion interconnecting the outer cylindrical and end surfaces of said dressing roller.

12. A method for dressing a cup-shaped wheel used for grinding teeth on a workpiece, the wheel having inside and outside working surfaces inclined at respective pressure angles with respect to an axis of rotation of the grinding wheel, comprising the steps of:

providing a cylindrical dressing roller mounted for rotation about an axis and having (a) an outer cylindrical dressing surface parallel to said axis, (b) an end dressing surface extending radially from said axis, and (c) a radiused rim portion between said cylindrical and end surfaces;

rotating the grinding wheel and dressing roller about their respective axes in the same direction when dressing the inside and outside working surfaces of said grinding wheel;

positioning said dressing roller in a first orientation relative to said grinding wheel so that part of the roller's outer cylindrical surface contiguous with said rim portion contacts one of said working surfaces at a predetermined clearance angle;

moving the roller and wheel relative to each other to move said point of contact along said first working surface for dressing same;

positioning said dressing roller in a second orientation so that a part of the roller's radially extending end surface contiguous with said rim portion contacts the other working surface of said grinding wheel at a predetermined clearance angle; and moving the roller and wheel relative to each other to move said second point of contact along said other working surface for dressing same.

13. The method of claim 12 wherein the step of providing said cylindrical dressing roller further comprises the step of selecting a roller which has substantially equal effective radii of curvature relative to the respective working surfaces of said grinding wheel when positioned, respectively, in said first and second orientations.

14. The method of claim 13 wherein the radius of the outer cylindrical surface of said selected roller ($R_{RA}$) and the radius of its rim portion (R) have the following relationships:

$$R_{RA} = R_{RB} + R \text{ and}$$

-continued
$$\frac{\cos a_i}{R_{RA}} - \frac{\cos \phi_i}{R_{WA}} = \frac{\sin a_o}{R_{RB}} + \frac{\cos \phi_o}{R_{WB}}$$

wherein:

$R_{RA}$ is the actual radius of said cylindrical outer surface of the dressing roller measured to its point of contact with the inside working surface of said grinding wheel;

$R_{RB}$ is the actual radius of said end surface of the dressing roller measured to its point of contact with the outside working surface of said grinding wheel;

$R_{WA}$ is the actual radius of the inside working surface of said grinding wheel measured to its point of contact with said dressing roller;

$R_{WB}$ is the actual radius of the outside working surface of said grinding wheel measured to its point of contact with said dressing roller;

$a_i$ is the clearance between dressing roller and the inside working surface of the grinding wheel;

$a_o$ is the clearance between dressing roller and the outside working surface of the grinding wheel;

$\phi_i$ is the pressure angle of the inside working surface of said grinding wheel;

$\phi_o$ is the pressure angle of the outside working surface of said grinding wheel; and R is the corner radius of the rim portion interconnecting the outer cylindrical and end surfaces of said dressing roller.

15. The method of claim 16 wherein said second relationship is simplified to:

$$R_{RA} = \frac{R_{AV}(\cos a_i + \sin a_o)}{\cos \phi_o + \cos \phi_i}$$

and wherein:

$$R_{AV} = \frac{R_{WA} + R_{WB}}{2}$$

16. An apparatus for dressing a cup-shaped grinding wheel mounted on a machine for grinding teeth on a gear-shaped workpiece, said apparatus including a dressing tool mounted for rotation about an axis adjustable to preselected angular orientations relative either to the inside or outside working surfaces of a cup-shaped grinding wheel, the improvement wherein said dressing tool is formed in the shape of a modified cylinder having an outer surface, an end surface and a radiused rim portion connecting said outer and end surfaces; and wherein said dressing tool is positioned so that, when dressing the inside working surface of said grinding wheel, part of said outer surface contiguous with said rim portion contacts the grinding wheel, and further, when dressing the outside surface of said grinding wheel, part of said end surface contiguous with said rim surface contacts the grinding wheel, and wherein, when said surfaces of the dressing tool are oriented, respectively, relative to said working surfaces of the grinding wheel, predetermined clearance angles are provided between the respective surfaces of said tool and said grinding wheel, said dressing tool further including at least one of (a) said outer surface extending at an angle less than parallel relative to said axis of said tool, the amount less than parallel being equivalent to one of said predetermined clearance angles and (b) said end surface of said dressing tool extending at an angle less than perpendicular relative to said axis of said tool by an amount equivalent to one of said clearance angles.

* * * * *